Patented May 20, 1930

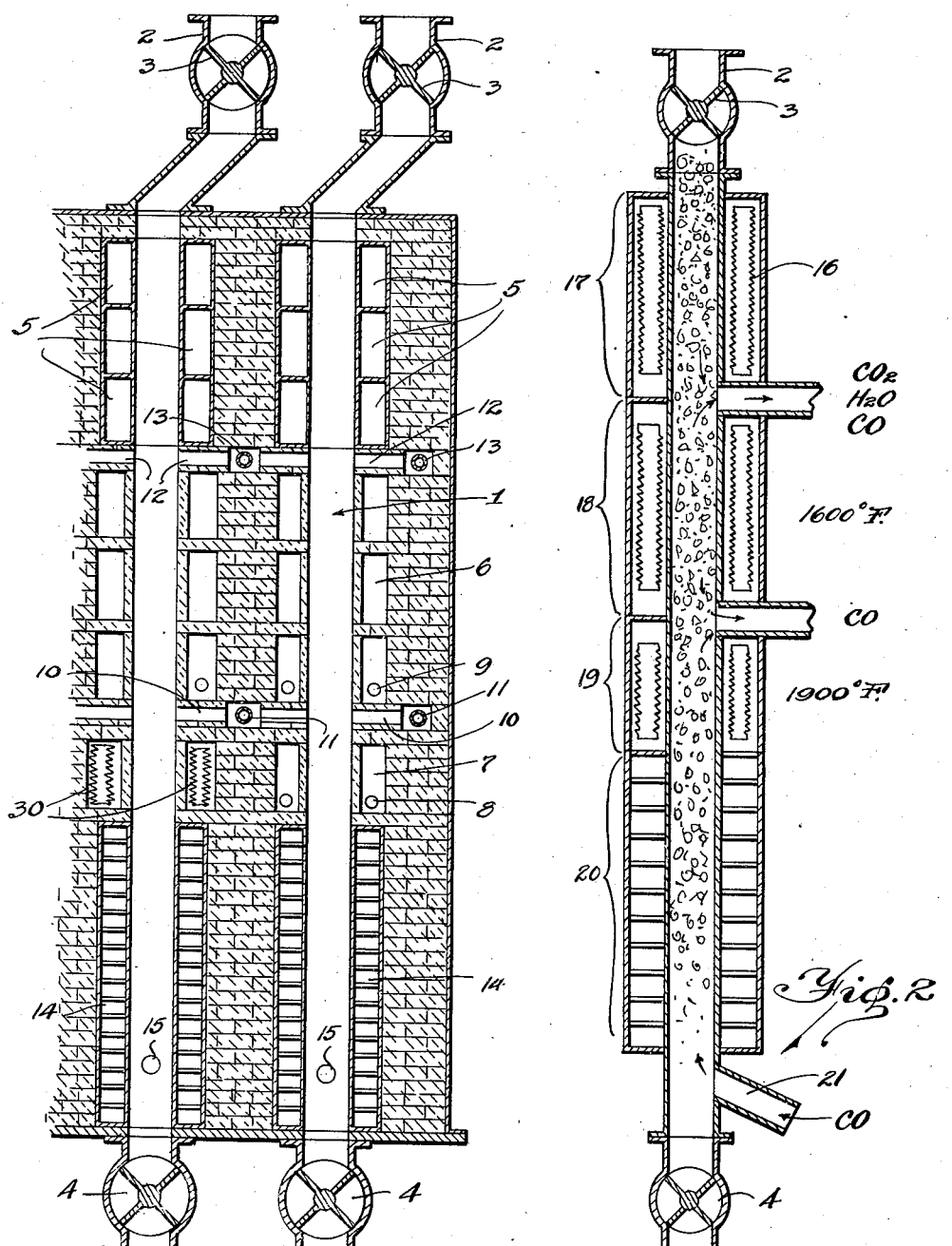

1,759,173

UNITED STATES PATENT OFFICE

WILLIAM H. SMITH, OF DETROIT, MICHIGAN

METHOD OF AND APPARATUS FOR REDUCING METALLIC OXIDES WITHOUT MELTING

Application filed May 10, 1928. Serial No. 276,579.

This invention relates to method of and apparatus for reducing metallic oxides without melting. It has to do particularly with the reduction of iron ore to sponge iron and contemplates a novel method of reduction wherein the oxygen is not only removed from the ore by the application of heat in the presence of a reducing medium to free the metallic iron, but includes a further step of isolating or removing the gases formed in the reduction step to prevent "swinging back" of the reduced metal and insure substantially 100% reduction.

The process of reducing metallic oxides, and particularly iron ore, without melting, has been known for many years and many attempts have been made, utilizing furnaces of widely varying design, to reduce iron ore without melting to a commercial grade of sponge iron which would compete in a fair way with the present use of pig iron in the commercial manufacture of iron and steel. Varying results have been obtained in the past, both as to quality and cost of production of the sponge iron, and while it has been found that iron ore may be reduced to sponge iron at particularly low reduction temperatures regardless of the design or method of reduction, much difficulty has been experienced in maintaining or obtaining a complete reduction of the iron ore to sponge iron.

I have discovered that the incomplete reduction heretofore experienced, has resulted from a "swinging back" of the reduced ore when the same has been cooled preparatory to being delivered to the atmosphere. While this cooling action has been necessary to prevent oxidization by the atmosphere, it has also resulted in the taking up by the reduced iron of oxygen from the cooled gases, such as $CO_2$ or $H_2O$, whereby to again form iron oxide.

The present invention contemplates the subjecting of an enclosed stream of metallic oxides to fixed zones of heat which progressively increase up to a point of reducing, and the positive taking off of the gases formed prior to, during and after reduction, at predetermined points, in order to eliminate oxidizing gases and prevent the "swinging back" of the reduced metal to its oxide during the cooling step.

A further important feature of the present invention resides in the step of forcing or inducing a positive blast of CO through the continuously traveling and reduced stream of sponge iron as it passes through the cooling zone, this blast of CO thus positively forcing out of the lower portions of the retorts any $CO_2$ or other oxidizing gases which might otherwise come down with the reduced metal. As the CO is a reducing gas, the reduced metal is moved through the temperature zone at which $CO_2$ would re-oxidize it, in a strongly reducing atmosphere.

Another feature of my novel method contemplates the step of passing the reduced material through a still higher heating zone between the reducing zone and the cooling zone to change the iron from open reduced form to compact larger or nodulized particles whereby to reduce the surface area and make the gangue more available for separation in addition to changing any $CO_2$ present to CO in the presence of C.

These novel method steps are carried out by a novel apparatus which is not only designed to provide the successive zones and means for venting the gases at predetermined points, but which is also designed to reduce the metallic oxide in an efficient continuous manner with a material saving of heat units.

In the drawings:

Fig. 1 is a fragmentary vertical sectional view of one form of furnace embodying my invention and capable of carrying out the method.

Fig. 2 is a diagrammatical view illustrating the preferred manner of subjecting the metallic oxides to successive fixed zones and the manner of venting the gases formed by the reduction process in order to prevent "swinging back."

The apparatus for carrying out my method may take various forms, but I prefer to use apparatus such as disclosed in Fig. 1 which is particularly designed for the reduction of iron ore. This furnace is preferably made up of a bank of ovens or retorts, wherein except for the end retorts the heating medium in each zone is confined between spaced streams of ore.

In the illustrated embodiment each oven or furnace consists of a retort 1 which extends the full height of the furnace and is completely enclosed. This retort is preferably long and narrow in cross section and is provided at the top with a suitable hopper or valve housing 2 for the continuous receiving and feeding of the iron ore into the retort, the said operation being accomplished by means of a suitable valve member 3 which may be continuously or intermittently operated as desired. The bottom of each retort is provided with a similar valve member 4. The R. P. M. of the valve members is controlled as desired whereby to continuously feed the iron ore and reduced iron into, through and out of each retort at a predetermined rate.

The walls of each retort are preferably formed of the heat conducting flues which define the respective heating zones, the top or preheating flues being designated 5, the intermediate or reducing zone flues being designated 6, and the flue or flues defining the nodulizing zone being designated 7. These three sets of flues are preferably interconnected and each flue on each side of the retort is provided with separate heating means in order to permit individual and accurate control of each retort and of each heating zone. The bottom heating flues 7 may each be provided with separate burners, as at 8, and the second set of flues 6 provided with separate burners 9 in order to maintain fixed definite heating zones in each set of flues.

The particular form of each retort and the bank of ovens in general is not important in this application other than that it is necessary to provide fixed and definitely-located heating zones. The important thing in the apparatus for carrying out my method is the provision of gas venting conduits intermediate the heating zones. An outlet conduit 10 is preferably provided between the zone defined by the flues 6 and the nodulizing zone defined by the flue 7. These outlet conduits or passageways 10 preferably extend transversely of the axis of each retort and the gases are then conducted away by suitable conduits 11 which extend longitudinally of the retorts and are connected to any suitable stack or exhausting means. By this construction it will be obvious that a plurality of transverse passageways 10 may be provided along the retort to convey gases away at a plurality of different horizontally spaced points, and this is the preferred construction.

Another set of transverse outlet flues 12 and common outlet conduits 13 are preferably provided between the reducing zone defined by the flues 6 and the preheating zone defined by the flues 5. Transverse conduits or passageways 12 are spaced along the side walls of each retort whereby to effect complete venting of the gases from the relatively thin stream of ore as it moves along the retort.

A series of flues 14 for receiving and tortuously conducting the cooling medium, are positioned to form the lower walls of the retort 1 and preferably extend a relatively great height so as to effect quick and positive cooling of the reduced metal moving through the retort. The flues 14 are preferably connected to the heating flues 6 and 7 or to the preheating flues 5, whereby to conserve the heat absorbed by the cooling medium from the reduced ore. Suitable inlet conduits 15 are positioned adjacent the bottom of each retort, formed by the cooling flues, whereby to introduce non-oxidizing gases in order to positively prevent any gases formed during the reduction process from coming down with the reduced ore. These gases also serve to cool the reduced metal.

My novel method is best described by the furnace diagrammatically illustrated in Fig. 2. This diagrammatic showing corresponds with the structure shown in Fig. 1 with the exception that the different heating zones are defined by the electrical resistance members 16. In carrying out my novel method I preferably provide four separate and distinct zones, namely, a preheating zone 17 preferably maintained at a heat up to 800° F., a reducing zone preferably maintained at an average of about 1600° F., a nodulizing zone 19 preferably maintained at about 1900° F., and a cooling zone 20.

With each retort separately maintained as described, the iron ore or other metallic oxides may be continuously fed into the retort to completely fill the same. As this flat stream of ore, together with a reducing agent such as carbon, descends in the retort it is first preheated, and as the mixture of ore and reducing medium is gradually heated up the carbon combines with the iron oxide, as in the present case, to liberate the iron and form $CO_2$ and C as follows:

$$(Fe_2O_3)_2 + 3C = 4Fe + 3CO_2$$

As this mixture further descends and is subjected to a higher reducing temperature of approximately 1600° F. carbon combines with the $CO_2$ to form $2CO$. At this point the iron oxide is completely reduced, and if the retort were completely enclosed the liberated iron and some of the CO would descend into the cooling zone whereby the CO would be cooled down and break up into C and $CO_2$. The $CO_2$ would react with the iron to again form iron oxide by reoxidization.

Were H present in the reducing chamber, $H_2O$ would be formed in the process of reduction, which if proceeded to the cooling zone would swing back and the $H_2O$ would reoxidize the iron to iron oxide leaving free H.

However, instead of allowing the gases

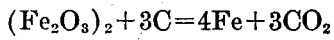

formed by the reducing reaction to descend with the ore towards and into the cooling zone, I preferably vent off the gases between the zone 17 and the zone 18, some of the $CO_2$ formed by the first reaction being vented off at this point and some of the CO formed in the complete reducing reaction also rising and being taken off at this point. As the reduced iron and some of the CO formed in the reducing reaction continue downwardly the greater part of the CO is vented off between the zones 18 and 19 and the reduced iron enters the cooling zone substantially free of all gases which would tend to swing the same back to an iron oxide.

In order to nodulize or conglomerate the iron particles into larger lumps or particles, I next preferably pass the reduced iron through a third heating or nodulizing zone which is preferably maintained above 1800° F., and approximately 1900° F., or higher. In passing through this zone the reduced iron particles shrink somewhat and are changed from an open reduced form to compact particles which adhere to each other and form new particles or nodules of much larger size. This materially reduces the surface area of the original iron particles, inasmuch as they are compactly contained within larger nodules and not only reduces the proportion of but also exposes any gangue and permits it to be more easily separated. Furthermore, if any $CO_2$ should be present at this point this much higher heat would tend to change the same into CO which would be taken off as such at the vent.

In order to assure that all $CO_2$ or oxidizing gases are removed from the stream of reduced ore, I preferably apply a blast of CO at a point 21, which rises counter current to any descending $CO_2$ and thus sweeps or washes out any $CO_2$ before it reaches the cooling zone. In other words, the CO being forced upwardly under pressure through the cooling zone will prevent any O, $CO_2$, or $H_2O$ from descending below the last heating zone. This last step is a physical action which forces out the $CO_2$ by positive pressure.

I may, however, cause the added stream of CO to move through the cooling zone by means of an induced draft or suction whereby to reduce the pressure, instead of producing a positive pressure. With a negative pressure in the reducing zone any $CO_2$ passing thereinto would change to CO in the presence of C more rapidly.

By this method I have been able to obtain in many instances 100% reduction, and in all other instances I have obtained substantially 100% reduction. In fact, I have assured reduction in that by allowing the furnace to operate relatively slowly to accentuate the cooling action, and by forcing the CO gas into the bottom of the retort, I have been able to carbonize the reduced iron to the particular degree required, the carbon combining with the iron, or in other words, the iron contains the carbon in combination.

In cases where it is desirable to obtain an excess of oxygen carrying gases over and above what the oxygen in the ore will give up, it is desirable to use an adjacent oven containing limestone, or $CO_2$, or $CO_2$ containing material, or oxygen in any convenient form in order to change the same to CO by applied heat and carbon, and add this so formed CO in the amounts desired. Or, it may be possible to add limestone with the charge in order to make gases. Thus, if the CO is added to the retort in the cooling zone it not only helps to cool the charge and to force any $CO_2$ out of the retort, but may also be used as a combustible gas when taken off.

Not only will the extra added CO gases serve as combustible gases when taken off, but the gases set up by the reactions throughout the process will form highly combustible or "producer" gases which may be used as the heating medium in the flues. In this respect I have shown in the second retort in Fig. 1, as at 30, electrical resistance means positioned in the lower heating zone or nodulizing zone to supply the heat required over and above that which would be supplied by the gases obtained from the retort itself. In other words, in some instances the combustible gases obtained from the retorts will supply about 70% of the total heat required for reduction and nodulizing, and by utilizing a small electric resistance, the additional 30% will be supplied. It will be obvious that this method of supplying the necessary reducing heat by the gases produced by and during the reducing of the ore plus a small amount of electric resistance, will be particularly advantageous in those localities when electric power is relatively cheap.

In case that hydrogen is used as a reducing material, it will of course be obvious that as the charge is heated up the hydrogen will combine with the oxygen to form $H_2O$ which will be taken off at the vents in the same manner as the $CO_2$ and CO, to prevent any "swinging back" of the reduced ore.

It will thus be seen that I have invented a novel apparatus and method for positively removing the $CO_2$ or $H_2O$ during and after reduction and before the cooling step whereby to positively prevent any "swinging back" of the reduced iron. It will also be obvious that I have provided a novel method, in addition to the 100% reduction of the iron ore, of nodulizing the reduced iron to form particles which are relatively much larger, and thus materially increase the efficiency of the reduction process.

Where it is desired to increase the CO output of a retort and where CO is readily available, it will be understood that I prefer to force the CO into the bottom of each retort in which case it will be relatively immaterial what pressure is maintained in the reducing or nodulizing zones. However, an exterior supply of CO gas may not always be available, and in such cases I prefer to close off such supply point for CO and increase the speed of formation of CO as well as increase the speed of reduction by maintaining a negative pressure within the retort. This will greatly accelerate the conversion of $CO_2$ to CO in the presence of carbon. It will be obvious that this negative pressure or slight vacuum may be maintained in withdrawing the gases from one or more points, and if desired, a slight negative pressure may be obtained even with the additional supply of CO at the bottom of the cooling zone.

It will further be seen that in Fig. 1 I have provided completely separate heating means for the reducing zone and the nodulizing zone. This is important for the reason that a considerably greater amount of heat units are required during the reducing action than during the nodulizing action, in spite of the fact that the reducing temperature is lower than the nodulizing temperature. In Fig. 1 I have shown the separate burner elements 8 and 9 as being positioned at the same end of the retort, but it will be understood that such burner elements may be oppositely positioned so that the flame from one burner is directed inwardly from one end of the retort, and the flame from the other burner, in the same zone, is directed inwardly from the opposite end of the retort. Such an arrangement is shown with respect to the burner elements in the reducing zone, in the second retort of Fig. 1. It will be obvious that this arrangement of oppositely spaced burners will equalize and maintain an even temperature across the length of the retort. Of course, if electrical resistance units are used, as at 30, this alternate arrangement of the burners will be unnecessary.

What I claim is:

1. The method of reducing iron ore and similar metallic oxides without melting, which consists in successively subjecting the ore and a reducing agent to a fixed reducing zone and cooling zone and completely eliminating the oxidizing gases formed by the reducing action before subjecting the reduced iron to the cooling zone.

2. The method of permanently reducing iron ore and similar metallic oxides, which comprises continuously moving the same in an enclosed retort, subjecting the same to a preheating, reducing and cooling zone, completely reducing the ore and eliminating the oxidizing gases formed by the reaction between the reducing agent and the iron ore before the reduced iron passes through the cooling zone.

3. The method of reducing iron ore and similar metallic oxides, which comprises enclosing and continuously feeding the ore and a reducing agent, subjecting the continuously moving mixture to a preheating zone to initially cause reaction between the reducing agent and ore, venting a portion of the gases formed by said initial reaction, subjecting the mixture to a reducing temperature sufficient to completely reduce the ore, eliminating substantially all of the oxidizing gases formed by the reducing action, subjecting the reduced metal to a cooling zone and forcing a non-oxidizing gas through the cooling zone to prevent any oxidizing gases formed by the reducing reaction from entering the cooling zone.

4. The method of reducing iron ore and similar metallic oxides, which consists in subjecting the ore and reducing agent to a reducing zone whereby the reducing agent combines with the oxygen to free the iron and form an oxidizing gas, passing the reduced iron through a cooling zone and forcing a supply of CO under pressure through the iron passing through the cooling zone to prevent any of said released oxidizing gases from passing with the reduced iron into the cooling zone.

5. The method of reducing iron ore and similar metallic oxides, which comprises enclosing and successively subjecting the ore and a reducing agent to a reducing zone and a cooling zone, removing the greater portion of the oxidizing gases formed by the reducing reaction at a point above the cooling zone, and positively preventing any of said gases from passing with the reduced iron through the cooling zone by drawing a supply of CO up through the reduced iron passing through the cooling zone.

6. The method of reducing iron ore and similar metallic oxides, which comprises enclosing and successively subjecting the ore and a reducing agent to a reducing zone and a cooling zone, removing the greater portion of the oxidizing gases formed by the reducing reaction at a point above the cooling zone, and positively preventing any of said gases from passing with the reduced iron through the cooling zone by forcing a supply of non-oxidizing gas up through the reduced iron passing through the cooling zone.

7. The method of reducing iron ore and similar metallic oxides, which comprises enclosing and continuously feeding the ore and a reducing agent, subjecting the mixture to a reducing zone of approximately 1600° F. to reduce the iron ore and then subjecting the reduced iron to a nodulizing zone of approximately 1800° F. or above, to conglomerate the fine iron into larger particles before subjecting the same to a cooling zone.

8. The method of reducing iron ore and similar metallic oxides, which comprises enclosing and continuously feeding the ore and a reducing agent, subjecting the mixture to a reducing zone of approximately 1600° F. to reduce the iron ore, removing the greater portion of the oxidizing gases formed by the reducing action, and then subjecting the reduced iron to a nodulizing zone of approximately 1800° F. or above, to conglomerate the fine iron into larger particles before subjecting the same to a cooling zone.

9. The method of reducing iron ore and similar metallic oxides, which comprises subjecting the ore and a reducing agent to a temperature sufficient to cause reaction between the reducing agent and ore and to substantially completely reduce the ore, and then subjecting the reduced metal to carbonizing gases and to a temperature zone above that of the reduction temperature whereby carbon is taken up in combination by the reduced metal.

10. The method of reducing iron and similar metallic oxides, which comprises enclosing and continuously feeding the ore and a reducing agent, subjecting the mixture to a reducing zone of approximately 1600° F. to reduce the ore, removing the oxidizing gases formed by the reducing reaction, and then subjecting the reduced metal to carbonizing gases and a temperature zone above that of the reduction zone whereby carbon is combined with the reduced metal.

11. The method of reducing iron ore and similar metallic oxides, which consists in successively subjecting the ore and a reducing agent to a fixed reducing zone and cooling zone, removing oxidizing gases formed by the reducing action before subjecting the reduced metal to the cooling zone, passing a carbonizing gas through the reduced metal and subjecting the reduced metal to a temperature zone, higher than the reducing zone, between the reducing action and cooling action whereby to change any $CO_2$ present to $CO$, in the presence of carbon.

12. The method of reducing iron ore and similar metallic oxides, which consists in successively subjecting the ore and a reducing agent to a fixed reducing zone and cooling zone, removing gases formed by the reducing action before subjecting the reduced metal to the cooling zone, passing a carbonizing gas through the reduced metal and subjecting the reduced metal to a temperature zone, higher than the reducing zone, between the point of removal of the gases and the cooling zone.

13. The method of permanently reducing iron ore and similar metallic oxides which comprises continuously moving the ore and a reducing agent, subjecting the mixture to a reducing zone and then forcing a strongly reducing cooling gas through the reduced metal to retard the passage with the reduced metal of any of said gases formed during the reducing action.

14. A method of permanently reducing iron ore and similar metallic oxides, which comprises continuously moving the ore and a reducing agent, subjecting the mixture to a reducing zone and then forcing a non-oxidizing gas through the reduced metal to retard the passage with the reduced metal of any of the oxidizing gases formed during the reducing action.

15. The method of reducing iron ore and similar metallic oxides, which comprises subjecting the ore and reducing agent to a reducing zone, separating the reduced metal and gases formed by the reaction, and then subjecting the reduced metal to a nodulizing zone whereby the fine reduced metal becomes congealed into larger particles.

16. The method of reducing iron ore and similar metallic oxides, which comprises subjecting the ore and reducing agent to a reducing zone, separating the reduced metal and gases formed by the reaction, subjecting the reduced metal to a nodulizing zone whereby the fine reduced metal becomes congealed into larger particles, passing the nodulized particles through a cooling zone and subjecting same to a counter draft of non-oxidizing gas to positively prevent any "swinging back" of the metal to its oxide.

17. The method of reducing iron ore and similar metallic oxides, which comprises subjecting the ore and reducing agent to a reducing zone, separating the reduced metal and gases formed by the reaction, subjecting the reduced metal to a nodulizing zone whereby the fine reduced metal becomes congealed into larger particles, and passing the nodulized particles through a cooling zone and subjecting the same to a counter current of carbonizing gas which passes up through the reduced metal in the cooling zone and through the nodulizing zone whereby carbon is taken up in combination with the reduced metal.

18. The method of reducing iron ore and similar metallic oxides, which comprises enclosing and successively subjecting the ore and a reducing agent to a reducing zone, a second zone maintained at a higher temperature than the reducing zone and a cooling zone, taking off gases formed during the reducing action at a point above the reducing zone, and taking off any other gases remaining or formed, at a point between the reducing zone and zone of higher temperature.

19. The method of reducing iron ore and similar metallic oxides, which comprises enclosing and successively subjecting the ore and a reducing agent to a reducing zone, a second zone maintained at a higher temperature than the reducing zone and a cooling zone, taking off gases formed during the reducing action at a point above the reducing zone, and taking off any other gases remaining or formed, at a point between the reducing zone and zone of higher temperature, and forcing a non-oxidizing gas through the reduced metal in the cooling zone and removing the greater portion of said gases at the point between the reducing zone and zone of higher temperature.

20. The method of reducing iron ore and similar metallic oxides, which comprises subjecting the ore and a reducing agent to a reducing temperature whereby to substantially completely reduce the ore without melting, removing oxidizing gases formed by the reaction to prevent "swinging back" of the reduced metal, and then subjecting the reduced metal to carbonizing gases and a higher heating zone whereby to form the reduced metal particles into larger particles and to take up carbon in combination therewith in the proportion desired.

21. Ore reducing apparatus, comprising a retort for receiving the ore and a reducing agent, means for continuously feeding the ore through the retort, heating means positioned adjacent the walls of said retort and defining a reducing zone, a cooling zone, and an intermediate zone maintained at a temperature higher than the reducing zone, and vents connected with said retort, positioned above said reducing zone and between said reducing zone and cooling zone.

22. Ore reducing apparatus, comprising an enclosed retort for receiving ore and a reducing agent, means for continuously feeding the ore through the retort, heating means positioned adjacent the walls of said retort for defining preheating, reducing, and nodulizing zones, means positioned beneath the nodulizing zone for conducting a cooling medium therethrough for cooling the reduced ore before delivery, an inlet conduit positioned beneath the cooling zone and outlet conduits for the retort, positioned between the preheating and reducing zones and between the reducing and nodulizing zone.

23. Ore reducing apparatus, comprising a retort long and narrow in cross section, means at the top and bottom thereof for controlling the continuous feeding of ore therethrough, heating means positioned adjacent the walls of said retort to define preheating, reducing and nodulizing zones, means for conducting a cooling medium adjacent the lower walls of said retort for defining a cooling zone, and a plurality of vent conduits extending from and spaced along the longitudinal walls of said retort and positioned between the preheating and reducing zones and between the reducing and nodulizing zones for venting off gases from the retort.

24. The method of permanently reducing iron ore and similar metallic oxides without melting, which consists in successively subjecting the ore and reducing agent to a fixed reducing zone and cooling zone, and eliminating oxidizing gases formed by the reducing action before subjecting the reduced iron to the cooling zone by carrying out the reducing action below atmospheric pressure.

25. The method of permanently reducing iron ore and similar metallic oxides, which comprises continuously moving the same and a carbonaceous reducing agent in an enclosed retort, subjecting the same to a preheating, reducing and cooling zone, completely reducing the ore and eliminating the $CO_2$ gases before the reduced iron passes through the cooling zone, the conversion of the $CO_2$ gases to CO being accelerated by maintaining the retort below atmospheric pressure.

26. The method of permanently reducing iron ore and similar metallic oxides and accelerating the formation of $CO_2$ in the presence of carbon, which comprises continuously moving the ore and a carbonaceous reducing agent in an enclosed retort, subjecting the same to a preheating, reducing and cooling zone, converting the $CO_2$ gases formed to CO in the presence of carbon, and accelerating this formation of CO by maintaining the retort below atmospheric pressure.

27. The method of reducing iron ore and similar metallic oxides without melting, which comprises continuously moving the ore and reducing agent in an enclosed retort, subjecting the same to a preheating, reducing and cooling zone, removing a portion of the gases formed and utilizing the same as a heating medium for a portion of the retort, and supplying the remaining heat units necessary by electric resistance means.

28. Ore reducing apparatus, comprising a retort for receiving ore and a reducing agent, means for continuously feeding the ore through a retort, a reducing zone and cooling zone, means positioned between the reducing zone and cooling zone for taking off a portion of the gases formed in the retort and utilizing the same for heating the retort, and electric resistance means positioned adjacent a portion of the retort for supplying the heat units required above those furnished by the gases taken from the retort.

29. Ore reducing apparatus, comprising a retort for receiving the ore and a reducing agent, means for continuously feeding the ore through the retort, separately controlled heating means positioned adjacent the walls of said retort and defining the reducing zone and nodulizing zone, a cooling zone, and vents connected with the retort and positioned above the cooling zone.

In testimony whereof I affix my signature.

WILLIAM H. SMITH.